UNITED STATES PATENT OFFICE.

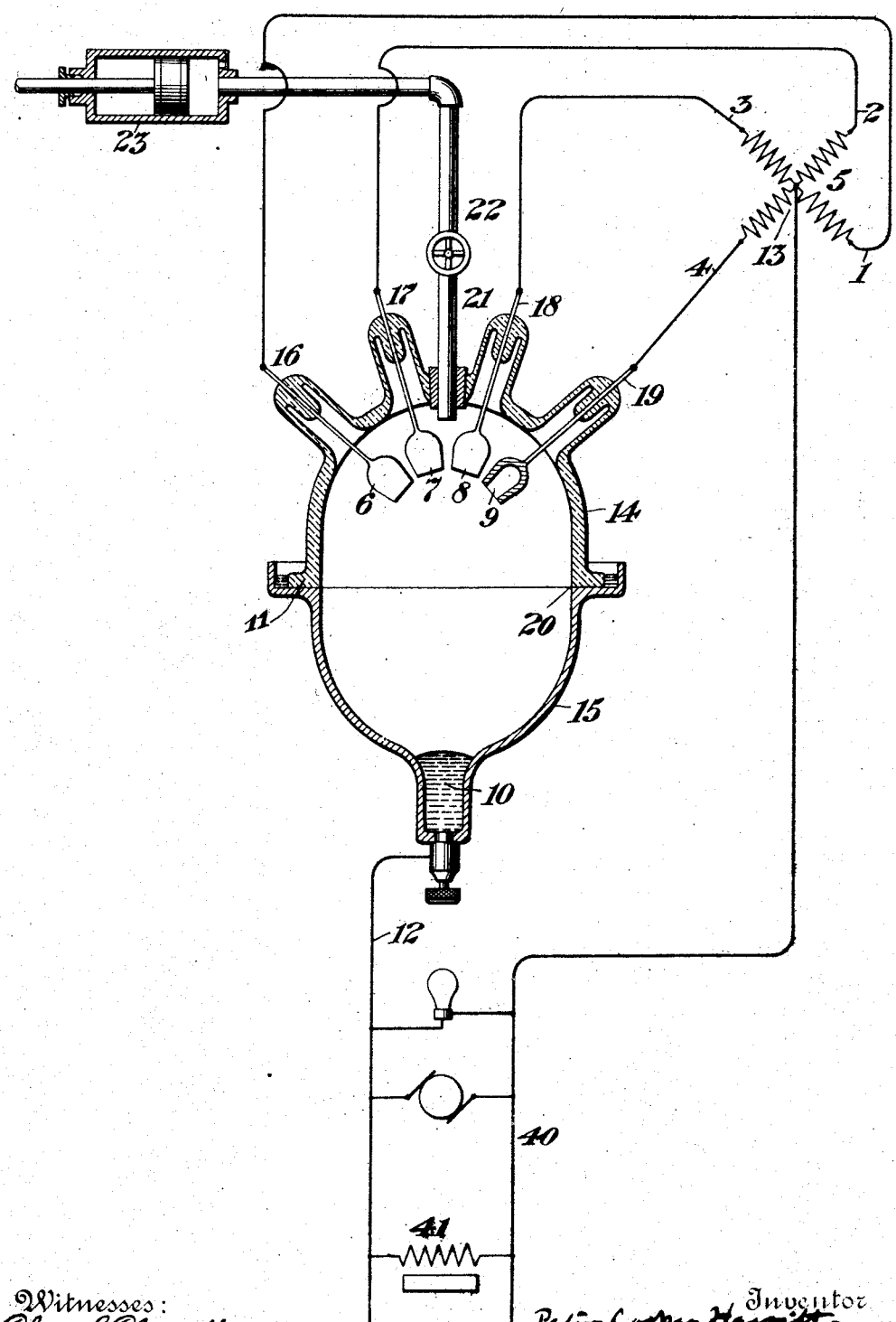

PETER COOPER HEWITT, OF NEW YORK. N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

DIRECTIONAL-CURRENT ARRESTER.

1,110,546.   Specification of Letters Patent.   Patented Sept. 15, 1914.

Original application filed February 3, 1903, Serial No. 141,661. Divided and this application filed June 13, 1907. Serial No. 378,710.

*To all whom it may concern:*

Be it known that I, PETER COOPER HEWITT, a citizen of the United States, and resident of New York, county of New York, State of New York, have invented certain new and useful Improvements in Directional-Current Arresters, of which the following is a specification.

My invention relates to certain improvements in electrical apparatus for deriving uni-directional electric currents from alternating electric currents, the device being useful, however, for various other purposes.

In carrying out my invention suitable gases or vapors are inclosed within a properly prepared chamber provided with electrodes for connection with the source of current. The general characteristics of such a device are set forth in certain patents issued to me on the 17th day of September, 1901, for example, United States Patents Nos. 682,690 to 682,699, inclusive. This device will permit the passage of current in a given direction, while practically prohibiting the flow of currents in the reverse direction. Thus, when used in connection with a source of alternating currents, uni-directional currents may be obtained due to the successive electro-motive-forces of one direction. If alternating electro-motive-forces of different phases are employed and each phase connected to its electrode and the device is at all times subjected to an impressed electromotive-force from one or another of the electrodes in a given direction, then there will be a continuous flow of current from the source or sources in one direction. The evenness of the flow will be largely dependent upon the number of phases employed, although this may be more or less modified by inductive effects or other causes.

In other words an inductance through its well known characteristics of storing energy on rising current and delivering energy on falling current, if properly placed in the circuit, will steady the flow of current, increasing the minimum flow and decreasing the maximum flow. By properly proportioning the inductance a reasonable degree of evenness of flow may be obtained. In this matter the number of phases of the supply employed has an important bearing on the natural amount of fluctuation of the current. It is the function of the inductance as described to still further improve the evenness of flow where such result may be desirable.

In constructing the apparatus, I have found it convenient to employ multiple electrodes of a suitable solid metal such, for instance, as chromium, copper or iron, but for the electrode acting as the negative, I have generally found mercury the most practical and durable, I have found it also convenient to employ mercury for the other electrodes under some conditions. For the purposes of the present description, however, reference will be had to forms using solid materials for the last named electrodes. The tendency of the negative electrode is to volatilize, and mercury serves well for the negative electrode by reason of its property of being able to volatilize and reconstruct itself, but other materials that possess this property will be serviceable for a negative electrode. When mercury is used, the conducting vapor will consist of mercury; other vapors and gases being as far as practical removed from the chamber.

While initially, there is offered a high resistance or reluctance to starting the passage of current through the device due to a condition which exists in or at the neighborhood of the electrode which is negative with reference to the applied electro-motive-force, yet when this reluctance to starting has been overcome or broken down, at said electrode, current will flow through the device under the influence of a relatively low electro-motive-force; and this condition continues at this electrode so long as the resistance or reluctance at this negative electrode is prevented from reëstablishing itself, while this reluctance existing at the other electrodes prevents current flowing therein.

By connecting several electrodes with the respective leads of a suitable polyphase source, and one electrode with a return conductor leading to a neutral point, there will always be impressed upon the device a difference of potential in the direction, tending to pass current from one or another of the several electrodes to the last named electrode. For convenience this latter is referred to as the negative, and the others as the positive electrodes. While each positive electrode is in turn negative with reference to the other positive electrodes, yet no current will pass from one to another of these, because the negative electrode reluctance at said electrode has not been broken down and prevents the flow.

I have further found that the current does not necessarily pass into the negative electrode at the point nearest the positive electrodes, and that, when a volatilizing material such, for instance, as mercury, forms part of the negative electrode, the current enters such part of the cathode to the exclusion of other portions and that, therefore, such a structure allows me to avail myself of the greater heat-conducting power of substances which may be electrically conducting for the walls of the vessel. Where it is desired to dissipate larger quantities of heat than would be carried off through glass or porcelain, it is possible to use a conductor for a large portion of the container without interfering with the action of the device.

I have further found that it is possible to maintain the contents of such an inclosing chamber sufficiently free from foreign or deleterious gases or vapors, and where the apparatus is liable to leakage, or transmission of gases they may be removed by the action of a pump which may be continuously or intermittently brought into action. If a gas tight joint is affected between the various parts of the inclosing chamber, the device may be initially pumped out and no further exhaustion required.

For the purpose of making the device of considerable mechanical strength, my present invention aims to make the chamber largely of metal.

In the accompanying drawings, I have illustrated one form of device showing in vertical section a container partly of metal and partly of insulating materials.

By reason of the fact that the apparatus permits the flow of the current in one direction but arrests the flow in the reverse direction, it may be conveniently and properly termed a uni-directional current arrester.

Referring to the drawing, 5 represents a source of polyphase electric currents (in this instance four phase), and 1, 2, 3 and 4, represent the conductors leading therefrom. These are, respectively, connected with positive electrodes 6, 7, 8 and 9, of the current arrester 11. The negative electrode 10 is connected by a conductor, 12, through any desired circuit with a neutral point 13 of the source 5.

The wall of the inclosing chamber is shown as consisting of two main sections 14 and 15. The section 14 is of glass or other suitable insulating material through which are passed the leading-in conductors 16, 17, 18 and 19, connected with the respective electrodes, 6, 7, 8 and 9. The section 15 consists of metal, such for instance, as copper or iron, which is fitted to the section 14 by a suitable joint as, for instance, by a ground joint as indicated at 20. The joint may be further sealed by any suitable plastic material, or sealed with mercury as shown.

I have shown the negative electrode 10 as consisting of a quantity of mercury which, in this case, yields the conducting vapor through which the currents pass. A nozzle 21 is here shown as connected with the chamber. It is provided with a suitable stop-cock, 22, and an exhaust pump, 23, of any suitable character, is shown as being connected with this nozzle. This pump may be operated at such times as necessary for maintaining the proper exhaustion within the chamber. It may be run continuously or at intervals as found necessary.

The general method of manufacturing the device is that set forth in certain patents issued to me on the 17th day of September, 1901, for instance patents numbered 682,692 and 682,699.

For the purpose of starting the device by breaking down or overcoming the initial negative electrode reluctance, a momentary impulse of high electro-motive-force is applied to the device, or a contacting device may be made use of.

Any of the means described in my patents of September 17, 1901, may be employed for starting the device.

The currents caused by the device to pass through the circuit 12 leading from the negative electrode may be employed for any desired purposes, and I have indicated in diagram at 40, such a work circuit. It may be desired to use a ballast device, 41, in some portion of the circuit especially when the load upon the work circuit is light. Otherwise the flow of current through the rectifier might be unstable or might be suppressed entirely. However, the use of the device, 41, in parallel with the other translating devices makes the circuit including the inductance 41, a ballast circuit, in that it provides continuous flow of current through the cathode and the rectifier. Not only is this result accomplished from the fact that current flows through the ballast circuit in addition to flowing through the other translating devices but through the well known steadying effect of the inductance which stores energy on rising currents and delivers energy on falling currents, thus measurably filling in the depressions and limiting the crests in the direct current wave.

In operation the device will generate more or less heat. It is desirable that the temperature be maintained reasonably low. The metal surfaces will radiate heat more readily than most insulating materials, and for this reason a current selector of given dimensions can be used in connection with currents of much larger quantities than one consisting essentially of glass or other similar material.

In another application, Serial Number 141,661, filed February 3rd, 1903, of which the present application is a division, claims are made on certain features of the apparatus described herein.

I claim as my invention:

1. In a system of electrical distribution the combination with a quarter phase alternating source and a direct current work circuit of a vapor rectifier comprising four anodes and a vaporizable cathode and connections from the terminals of said source to said anodes, from the neutral point of said source to said work circuit and from the cathode of said rectifier to said work circuit, of an inductance in shunt to said work circuit.

2. In a system of electrical distribution, the combination with a source of polyphase alternating current, a direct current work circuit and a polyphase mercury vapor rectifier between said source and said work circuit, of an inductive shunt for said work circuit whereby current flows through said rectifier independently of the operation of the devices in said work circuit.

3. In a system of electrical distribution comprising an alternating source and a mercury vapor rectifier and a direct current work circuit, means for maintaining continuity of current regardless of the operation of translating devices in said work circuit, said means consisting of an inductance and connections from the terminals of said inductance respectively to the mains of said work circuit.

Signed at New York, in the county of New York, and State of New York, this 11th day of June A. D. 1907.

PETER COOPER HEWITT.

Witnesses:
WM. H. CAPEL,
THOS. H. BROWN.